United States Patent
Yamamoto et al.

(10) Patent No.: US 7,194,905 B2
(45) Date of Patent: Mar. 27, 2007

(54) ACCELERATION SENSOR

(75) Inventors: Akira Yamamoto, Nara (JP); Yasuo Sugimori, Mie (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 11/224,334

(22) Filed: Sep. 12, 2005

(65) Prior Publication Data

US 2006/0053889 A1    Mar. 16, 2006

(30) Foreign Application Priority Data

Sep. 14, 2004    (JP)    ............... 2004-266977

(51) Int. Cl.
*G01P 15/125*    (2006.01)
(52) U.S. Cl. ............ 73/514.32; 73/493; 73/504.12; 73/504.14; 73/614; 73/514.01; 73/514.16
(58) Field of Classification Search ............ 73/514.16, 73/614, 493, 504.12, 504.14, 514.01, 514.32
See application file for complete search history.

(56) References Cited

U.S. PATENT DOCUMENTS

| | | | |
|---|---|---|---|
| 6,378,381 B1 * | 4/2002 | Okada et al. | 73/862.043 |
| 6,859,048 B2 * | 2/2005 | Okada et al. | 324/681 |
| 6,990,867 B2 * | 1/2006 | Okada | 73/780 |

FOREIGN PATENT DOCUMENTS

| | | | | |
|---|---|---|---|---|
| EP | 1031837 | A1 * | 8/2000 | |
| JP | 10010150 | | 1/1998 | |
| JP | 10010150 | A * | 1/1998 | |
| JP | 2000275273 | | 10/2000 | |
| JP | 2000275273 | A * | 10/2000 | |
| JP | 2000346866 | | 12/2000 | |
| JP | 2000346866 | A * | 12/2000 | |
| JP | 2001083177 | | 3/2001 | |
| JP | 2001083177 | A * | 3/2001 | |

* cited by examiner

*Primary Examiner*—Hezron Williams
*Assistant Examiner*—Samir M. Shah
(74) *Attorney, Agent, or Firm*—The Webb Law Firm

(57) ABSTRACT

A three-axis acceleration sensor having a simple construction is provided for improving shock resistance without lowering sensor sensitivity.

An acceleration sensor for detecting acceleration in three orthogonal directions comprises an electrode substrate pair including electrode substrates (4) opposed to each other, and each having fixed electrodes (4c, 4b, 4a) corresponding to three axes, respectively, a diaphragm (2) acting as a movable electrode, and an umbrella-like weight (3) mounted centrally of the diaphragm (2).

Acceleration is detected based on variations in capacitance between the fixed electrodes (4c, 4b, 4a) and diaphragm (2).

Each electrode substrate (4) has an electret layer (1) formed to cover surfaces of the fixed electrodes (4c, 4b, 4a). At least one of the electrode substrates defines, centrally thereof, a through hole (7). A shaft portion of the umbrella-like weight (3) extends through the through hole (7) from outside, and is connected to the diaphragm (2).

5 Claims, 3 Drawing Sheets

ACCELERATION SENSOR

BACKGROUND OF THE INVENTION

1. Field of the Invention

The present invention relates to an acceleration sensor for detecting acceleration in three orthogonal directions.

2. Description of the Related Art

Various acceleration sensors have been proposed for detecting acceleration in three-dimensional directions, i.e. along X-axis, Y-axis and Z-axis. Japanese patent application "Kokai" No. 10-10150 cited herein as Document 1 (FIGS. 1 to 3, and paragraphs 7 to 22), for example, discloses an acceleration sensor for detecting acceleration based on variations in capacitance between a fixed electrode and a movable electrode opposed to each other. According to this technique, one of the fixed electrode and movable electrode has an electret film formed on a surface thereof opposed to the other electrode. The movable electrode has a weight attached to a surface thereof facing away from the fixed electrode to allow for displacement of the movable electrode in time of impression of acceleration. The other electrode not having the electret film is divided along orthogonal axes crossing one another at an intersection corresponding to a position of projection of the center of gravity of the weight. That is, with one of the electrodes divided, acceleration along a plurality of axes is detected based on variations in capacitance of the divided electrode.

SUMMARY OF THE INVENTION

Acceleration sensors and vibration sensors of the electret condenser microphone (hereinafter called "ECM") type as disclosed in Document 1 have various applications such as pedometers and vibrometers. These sensors are required to have high sensitivity comparable to that of ordinary sensors. However, when used as a pedometer, for example, the sensor is in many cases battery-driven, and naturally, abundant power supply cannot be expected. It is therefore undesirable to improve sensitivity electrically by using an IC (integrated circuit) for amplification which will consume a large amount of current.

An attempt to improve sensitivity mechanically will need to increase the force of inertia. However, when the amplitude of the movable electrode is increased in order to increase the force of inertia, the sensor will have reduced shock resistance in time of falling of the sensor. It is therefore difficult for the basic structure alone shown in Document 1 to cope fully with these problems.

The present invention has been made having regard to the above problems, and its object is to provide a three-axis acceleration sensor having a simple construction for improving shock resistance without lowering sensor sensitivity.

The above object is fulfilled, according to the present invention, by an acceleration sensor for detecting acceleration in three orthogonal directions, comprising:

an electrode substrate pair including two electrode substrates each having fixed electrodes arranged on one surface thereof, the fixed electrodes on one electrode substrate being opposed to the fixed electrodes on the other electrode substrate;

a diaphragm disposed held between the electrode substrate pair by spacers providing a predetermined distance from the electrode substrate pair to the diaphragm, the diaphragm acting as a movable electrode; and a weight mounted on the diaphragm with the center of gravity of the weight coinciding with the center of the diaphragm;

wherein the acceleration in three orthogonal directions along a first axis, a second axis and a third axis, the first axis extending through the center of gravity of the weight and perpendicular to the electrode substrates, is detected based on variations in capacitance between the fixed electrodes and the movable electrode;

characterized in that the weight is formed to have an umbrella-like shape including a cylindrical shaft portion, and a disk-like main portion having a larger diameter than the shaft portion;

that the fixed electrodes on each of the electrode substrates include an annular, first fixed electrode extending around the first axis and having a larger diameter than said shaft portion, and second fixed electrodes and third fixed electrodes that are two parts each of an annular electrode having a larger diameter than the first fixed electrode, and divided by dividing axes forming 45 degrees with the second axis and the third axis;

that each of the electrode substrates has an electret layer formed to cover surfaces of the fixed electrodes, at least one of the electrode substrates defines, centrally thereof, a through hole having a diameter larger than a diameter of the shaft portion and smaller than an inside diameter of the first fixed electrode;

that the main portion of the weight is located outside the electrode pair having the second electrodes and the third electrodes opposed to each other, respectively; and that the shaft portion of the weight extends through the through hole, and is connected to the diaphragm.

With this characteristic construction, the acceleration sensor according to the invention is the ECM type using an electret, and can therefore output a capacitance directly as a voltage. The ECM type construction does not require a bias circuit for impressing a bias voltage between the diaphragm (movable electrode) and fixed electrodes, thereby allowing for compact circuitry and reducing cost.

The acceleration sensor according to the present invention employs what is known as a push-pull system with the diaphragm held between the two electrode substrates having the second electrodes and the third electrodes opposed to each other, respectively. Compared with a system that uses only one surface of the diaphragm, this sensor can obtain a very high electric output for a mechanical amplitude of the diaphragm.

At least one of the electrode substrates defines a through hole, and only the shaft portion of the umbrella-like weight extends through this through hole and is connected to the diaphragm. The main portion of the weight is disposed outside the electrode substrate pair. As a result, regardless of the size of the weight, the interval of the electrode substrate pair can be narrowed. This facilitates detection of capacitance variations. When desired, the mechanical amplitude of the diaphragm may be changed easily by changing the size of the main portion outside the electrode substrate pair. Thus, this acceleration sensor is versatile to be used for various purposes. Further, since the connection between the weight and diaphragm is made by the thin shaft portion, a sufficient area may be secured for the first fixed electrodes opposed to the central portion of the diaphragm where mechanical amplitude is the largest in the direction along the first axis.

With this characteristic construction which promotes the advantages of the ECM type and push-pull type, the acceleration sensor can output voltage of the ECM directly to an inexpensive general-purpose operational amplifier or the like without requiring an expensive capacitance-voltage conversion circuit (CV conversion circuit). A CV conversion circuit often comprises an IC (integrated circuit) for exclusive use, and a construction has been proposed for processing signals for three axes with one IC, but this consumes current as large as several milliamperes. Therefore, when this acceleration sensor is incorporated into a battery-driven device, the battery will be consumed quickly, which is undesirable. A general-purpose operational amplifier consumes current as small as several microamperes, and can reduce power consumption of the device.

As a feature of the invention, the fixed electrodes may be formed on a surface of each of the electrode substrates without protruding or sinking therefrom.

The electret layer is formed on the surface of each electrode substrate, for example, by calcining an aqueous dispersion of fluororesin applied to the surface of the electrode substrate to serve as electret, or by applying a fluoride film to the surface of the electrode substrate. The fixed electrodes are formed of copper foil or the like on the electrode substrate. Usually, these are provided by an electric conducting pattern of copper foil is formed by etching or the like on a glass epoxy backing serving as an insulator. Thus, although very thin, the pattern of copper foil is raised above the backing of the substrate. Then, the thickness of the electret layer formed thereon may become uneven. This may affect the capacitance detected and the voltage outputted as a result, which is undesirable. Where the copper foil forming the electrode pattern is provided to be flush with the surface of the backing of the substrate, without protruding or sinking from the surface, the thickness of the electret layer may be uniformed.

As another feature of the invention, the fixed electrodes are formed of copper foil, and the electret layer is formed, after plating the fixed electrodes with nickel or gold, by applying thereto and calcining an aqueous dispersion of a fluororesin, or applying thereto a fluoride film.

Copper, because of its excellent electrical conductivity, is generally used as electrodes arranged on a substrate as described above. However, copper foil widely used for electrode patterns easily oxidizes and discolors to reduce the function as electret. Particularly when an aqueous dispersion of fluororesin is applied and calcined to serve as electret layer, the copper foil may oxidize and become dark. Copper foil easily oxidizes and discolors, and may discolor also when a fluoride film is applied.

The above problem may be lessened by plating the copper foil with nickel or gold, before coating with the electret by applying the fluoride film or by applying and calcining the aqueous dispersion of a fluororesin.

As a further feature of the invention, the diaphragm includes, as divided by four slits, a fixed portion located peripherally and fixed through the spacers, a vibrating portion located centrally and having the weight, and a plurality of elastic support portions arranged equidistantly and circumferentially of the diaphragm for connecting the fixed portion and the vibrating portion, the slits being arranged equidistantly and circumferentially of the diaphragm, with an end region adjacent the vibrating portion of each slit radially overlapping an end region adjacent the fixed portion of a next slit.

Where the diaphragm is divided into a fixed portion, a vibrating portion and elastic support portions, the elastic support portions connecting the fixed portion and vibrating portion act as torsion bar anchors. An uneven connection by the elastic support portions between the fixed portion and vibrating portion may result in a difference in output between a time of vibration along the second axis and third axis, i.e. in the XY directions, among the three axial directions detected by the acceleration sensor. It is also advantageous to enlarge the area of the vibrating portion in order to obtain greater variations in the capacitance of the ECM.

As in the above characteristic construction, the slits are arranged equidistantly in the circumferential direction, with an end region adjacent the vibrating portion of each slit radially overlapping an end region adjacent the fixed portion of a next slit. With this construction, the vibrating portion may be formed substantially circular, which is effective to suppress a difference occurring between the XY directions. The elastic support portions can secure a good length in the circumferential direction, and may therefore be formed narrow without affecting the resilience thereof. As a result, the vibrating portion can secure a large area to realize the advantage of obtaining greater variations in the capacitance. Further, since the elastic support portions can provide appropriate resilience and strength, the vibrating portion may be given an increased mechanical amplitude. As a result, no circuit is required for amplification or for correcting detecting directions, thereby simplifying a circuit construction.

As a further feature of the invention, each of the slits may include an outer track adjacent the fixed portion, an inner track adjacent the vibrating portion, and an S-shaped connecting track connecting the outer track and the inner track.

Where both the outer track and inner track are formed parts of circular tracks, the vibrating portion is formed more close to circular to suppress a difference in output between the X- and Y-directions. The outer track and inner track are connected by a curved or S-shaped connecting track. Compared with the case of each elastic support portion having an angled connection between the vibrating portion and fixed portion, a force acting on the above connection may be distributed to avoid its concentration. Thus, even when an excessive shock is applied to the acceleration sensor as by falling, for example, the diaphragm is less likely to be damaged and has improved shock resistance.

If the slits were formed simply narrow and linear, a strong force acting on the slits could break the slits per se, or the slits could fail to absorb such a strong force, thereby distorting the diaphragm. The reaction from the case is dynamically the most intensive in the directions perpendicular to the tangents at the points of contact noted above. Where the slits have the semicircular cutouts bulging in the same directions as the projections, the slits have an increased width in the above directions perpendicular to the tangents at the points of contact. As a result, the slits can demonstrate yield strength against an increased reaction.

The acceleration sensor can obtain an output with advantage where the diaphragm has a great mechanical amplitude resulting from acceleration applied. On the other hand, there is a drawback of being damaged when subjected to an excessive shock such as a fall. The diaphragm is not formed of PET (polyethylene terephthalate) or PPS (polyphenylene sulfide) film, but formed of a material having high flexural strength such as SK material (carbon tool steels: JIS G 4401), stainless steel, phosphor bronze, Be—Cu, Ti—Cu or the like. In this way, the diaphragm itself may be given increased strength. The connection between the diaphragm and weight may be achieved by adhesion, electric welding, laser spot welding, calking, etc.

DESCRIPTION OF THE PREFERRED EMBODIMENT

A preferred embodiment of the acceleration sensor according to the present invention will be described hereinafter with reference to the drawings.

Figure 1:
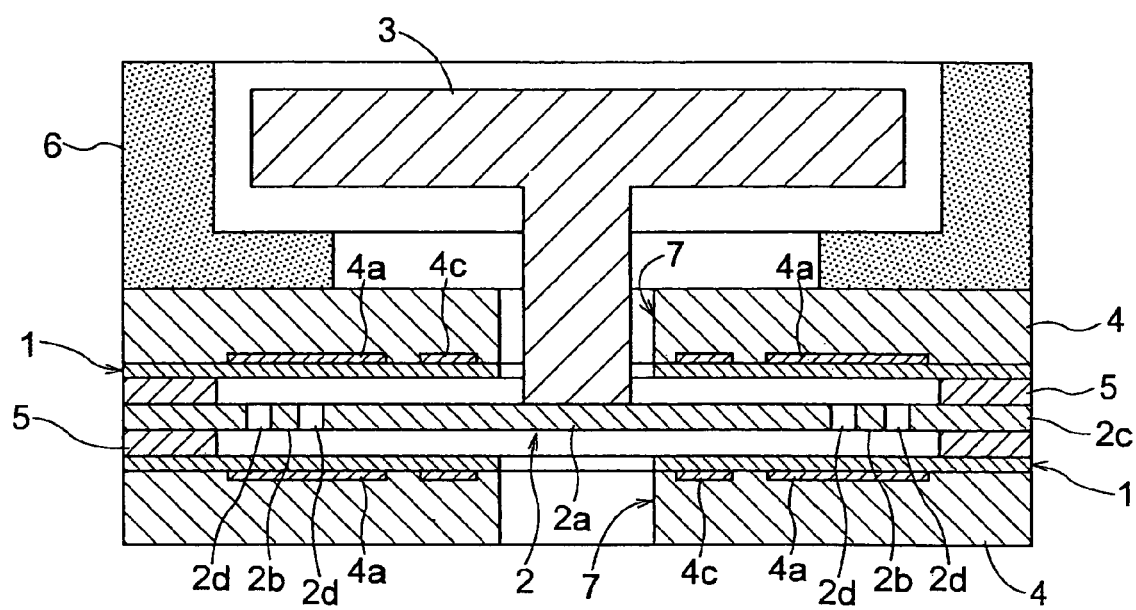
FIG. 1 is a section view showing an example of construction of an acceleration sensor according to the present invention.

The acceleration sensor according to the invention includes a conductive case of channel-shaped section having a bottom at one end, and an opening at the other end, and a capacitance detecting mechanism of the electret condenser microphone (ECM) type mounted in the case as shown in FIG. 1. As shown in FIG. 1, the sensor has a push-pull type construction including an electrode substrate pair having two electrode substrates 4, each with fixed electrodes arranged on one surface, covered by an electret layer 1, and opposed to the fixed electrodes on the other substrate 4, a diaphragm 2 acting as a movable electrode held between the electrode substrate pair by spacers 5 for providing a predetermined distance from the electrode substrate pair, and a weight 3 attached to the diaphragm 2 with the center of gravity of the weight 3 coinciding with the center of the diaphragm 2. This acceleration sensor has the ECM type capacitance detecting mechanism for detecting, based on variations in capacitance between the fixed electrodes and movable electrode, acceleration in three orthogonal directions along a first, a second and a third axes, the first axis extending through the center of gravity of the weight 3 and perpendicular to the electrode substrates 4.

Figure 2:
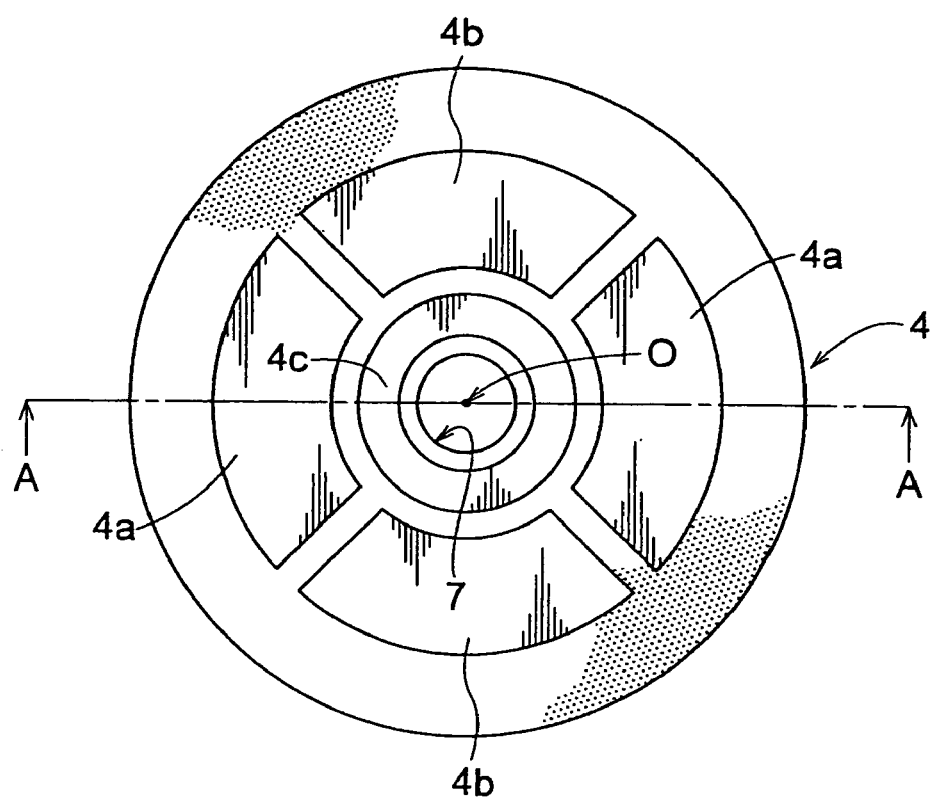
FIG. 2 is a view showing an arrangement of fixed electrodes formed on an electrode substrate of the acceleration sensor of FIG. 1.
Figure 2:
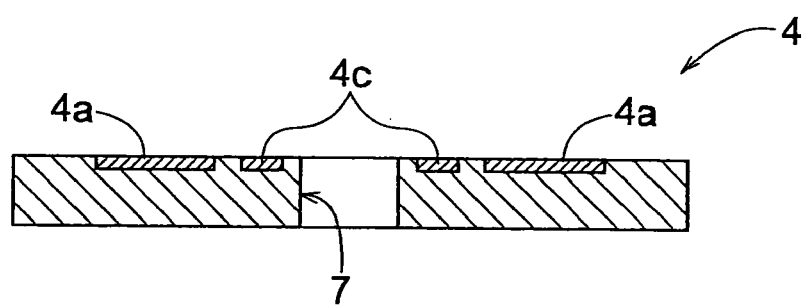

To compare the above three axes to what is called XYZ axes, the first axis extending through the center of gravity of the weight 3 and perpendicular to the electrode substrates 4 is the Z-axis, and the second and third axes intersecting at right angles to each other at an intersection O of the electrode substrate 4 and the first axis, and extending perpendicular to the first axis, are the X-axis and Y-axis, respectively. As shown in FIG. 2 (a), the fixed electrodes are formed on each electrode substrate 4 as associated with the XYZ axes. A first fixed electrode 4c for detecting acceleration along the Z-axis or first axis is an annular electrode having an inside diameter larger than a diameter of a shaft portion 3a of the weight 3. Second fixed electrodes 4b and third fixed electrodes 4a for detecting acceleration along the X-axis or second axis the Y-axis or third axis are two parts each of an annular electrode having a larger diameter than the first fixed electrode 4c, and divided by dividing axes forming 45 degrees with the second axis and third axis. The second axis extends through the middle of each of the two divided second electrodes 4b. The third axis extends through the middle of each of the two divided third electrodes 4a.

Figure 4:
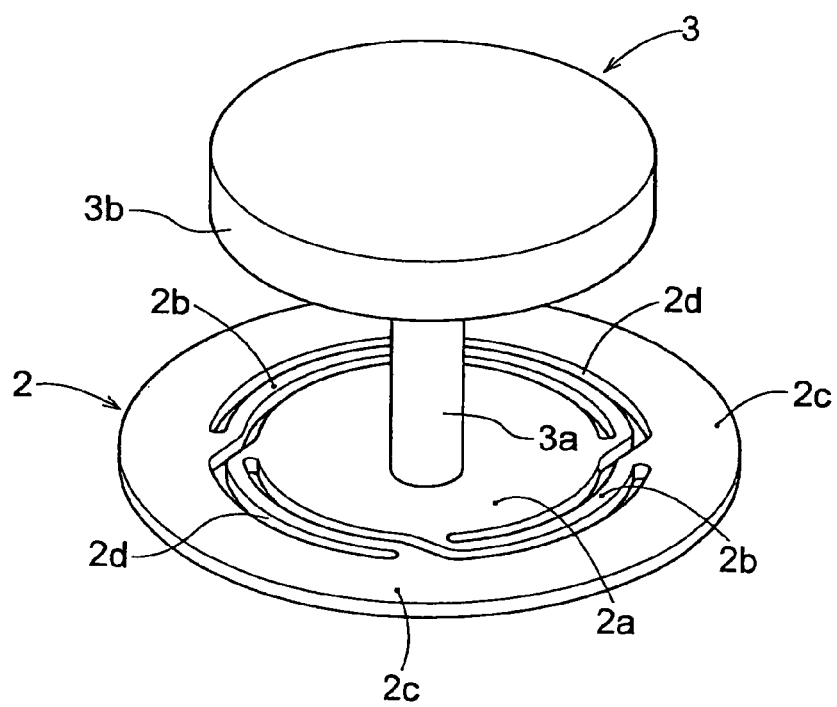
FIG. 4 is a perspective view showing the diaphragm and a weight attached to the diaphragm of the acceleration sensor of FIG. 1.

As shown in FIG. 1, each of the two electrode substrates 4 has the electret layer 1 covering the surfaces of fixed electrodes 4a–4c. The two electrode substrates 4 are arranged to have the respective second fixed electrodes opposed to each other and the respective third fixed electrodes opposed to each other. Further, at least one of the two electrode substrates 4 has a through hole 7 formed centrally thereof for passing the shaft portion 3a of the weight 3. Of course, both of the electrode substrates 4 may have through holes 7 as shown in FIG. 1. As shown in FIG. 4, the weight 3 is formed to have an umbrella-like shape, including the cylindrical shaft portion 3a, and a disk-like main portion 3b having a larger diameter than the shaft portion 3a. Thus, the through holes 7 have a larger diameter than the shaft portion 3a, which is smaller than the inside diameter of the first fixed electrode 4c.

Thus, in the acceleration sensor in this embodiment, at least one of the two electrode substrates 4 has a through hole 7 formed centrally thereof for passing the shaft portion 3a of the weight 3, and the diaphragm 2 is held through the spacers 5 between the two electrode substrates (inside the electrode substrate pair), with the second electrodes 4b and third electrodes 4a opposed to each other, respectively. A forward end of the shaft portion 3a of the weight 3 is connected to a central portion of the diaphragm 2. The main portion 3b of the weight 3 is disposed opposite the surface having no electret layer of one of the electrode substrates 4. That is, the main portion 3b of the weight 3 is disposed outside the electrode substrate pair. Acceleration applied to the acceleration sensor is vibrated by the weight 3 to displace the diaphragm 2. The displacement of the diaphragm 2 varies the capacitance between the fixed electrodes 4a –4c and diaphragm 2 (movable electrode). These variations are taken out as voltage values to detect acceleration along the three shafts.

As described above, the main portion 3b of the weight 3 is disposed outside the electrode substrate pair. Regardless of the size of the weight 3, the interval of the electrode substrate pair can be narrowed. This facilitates detection of capacitance variations. When desired, the amplitude of the diaphragm 2 may be changed easily by changing the size of the main portion 3b outside the electrode substrate pair. Thus, this acceleration sensor is versatile to be used for various purposes, and is desirable also for preparing a diverse product lineup. Further, since the connection between the weight and diaphragm is made by the thin shaft portion, a sufficient area may be secured for the first fixed electrodes corresponding to the central portion of the diaphragm 2 where amplitude is the largest in the direction along the first axis.

The embodiment described above provides what is known as a push-pull type construction with the diaphragm 2 held between the two electrode substrates 4. The electric charges of the electret layers 1 provided for the two electrode substrates 4 may have homopolar potentials or heteropolar potentials.

The electret layer 1 is formed of FEP (tetrafluoroethylene-hexafluoropropylene copolymer), PTFE (polytetrafluoroethylene) or PFA (tetrafluoroethylene-fluoroalkylvinylether copolymer). The electret layer 1 is formed by a method in which an aqueous dispersion of a fluororesin is applied and then calcined as shown in Japanese Patent No. 3387012, for example. The electret layer 1 obtained is about 5.0 μm in thickness, which is much thinner than a conventional 12 μm layer formed by applying FEP film.

On the other hand, the fixed electrodes 4a–4c described above are formed on each electrode substrate 4 as an electric conducting pattern of copper foil. Where such an electric conducting pattern of copper foil is formed by etching or the like on a glass epoxy backing serving as an insulator as is an ordinary printed circuit board, the pattern has a thickness of about 35 µm. Even when formed especially thin, the pattern is about 5 µm thick. Consequently, the pattern of copper foil is raised above the backing of the substrate. When, as in this embodiment, the electret layer 1 is formed thin, in particular, the thickness of the electret layer 1 may become uneven. This may affect the capacitance detected and the voltage outputted as a result. To avoid such an inconvenience, as shown in FIG. 2 (b), the foil forming the electrode pattern may be embedded in the backing of the substrate to be flush with the surface, without protruding or sinking from the surface of the backing. This realizes a uniform thickness of the electret layer 1.

In this way, the electret layer 1 is formed to cover the fixed electrodes 4a–4c formed of copper foil. However, copper foil easily oxidizes and discolors to reduce the function as electret. Particularly when the electret layer 1 is formed by calcining an aqueous dispersion of fluororesin applied to the surface of each electrode substrate 4, the copper foil portion may oxidize and become dark to reduce the function as electret. To avoid this inconvenience, the copper foil of the fixed electrodes 4a–4c may be plated with nickel, gold or the like, and then coated with the electret.

Each electrode substrate 4, with the electret layer 1 formed on one surface thereof, has a capacitor, a resistor and an operational amplifier for signal processing, or connectors and wiring for signal out and power supply, mounted, as necessary, on the other surface. Signals are transmitted via through holes formed in the electrode substrate 4 to these components from the fixed electrodes 4a–4c formed on the one surface.

Figure 3:
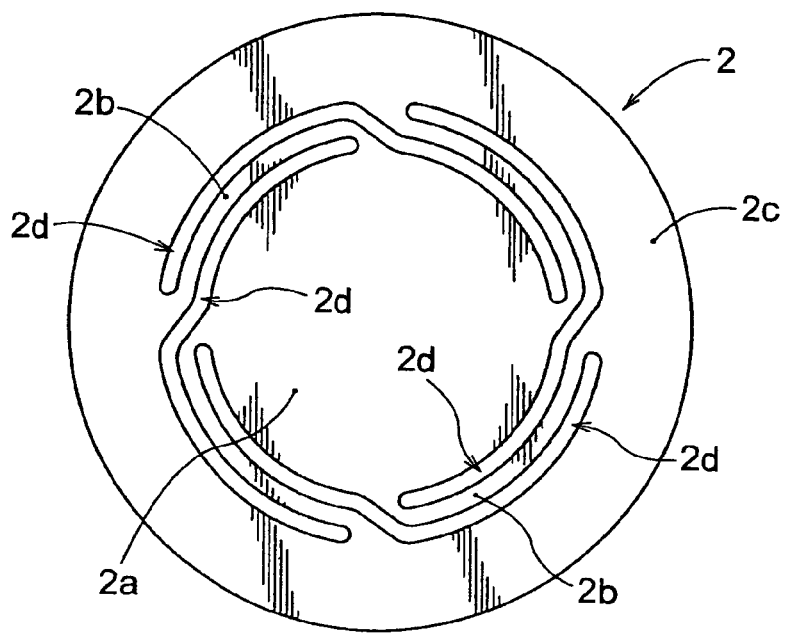
FIG. 3 is a view showing a shape of a diaphragm of the acceleration sensor of FIG. 1.

FIG. 3 is a view showing the shape of the diaphragm 2 of the acceleration sensor of FIG. 1. The diaphragm 2 is not formed of PET (polyethylene terephthalate) or PPS (polyphenylene sulfide) film, but formed of a conductive metal material having high flexural strength such as SK material (carbon tool steels: JIS G 4401), stainless steel, phosphor bronze, Be—Cu, Ti—Cu or the like. By using a material of good strength property, the diaphragm 2 of suitable shape may be formed as described hereinafter.

As shown in FIG. 3, the diaphragm 2 is divided by four slits 2d into a fixed portion 2c located peripherally and fixed through the spacers 5, a vibrating portion 2a located centrally and having the weight 3, and a plurality of elastic support portions 2b arranged equidistantly in the circumferential direction and connecting the fixed portion 2c and vibrating portion 2a. The slits 2d are arranged equidistantly in the circumferential direction, with an end region adjacent the vibrating portion 2a of each slit 2d radially overlapping an end region adjacent the fixed portion 2c of a next slit 2d. As a result, the elastic support portions 2b have a four-part construction, so that the acceleration sensor in this embodiment has a four-point support structure to be supported from directions displaced by 90 degrees.

The elastic support portions 2b connecting the fixed portion 2c and vibrating portion 2a act as torsion bar anchors. It is advantageous to enlarge the area of the vibrating portion 2a in order to obtain greater variations in the capacitance of the ECM. In order to avoid a difference in output between a time of vibration along the second axis and third axis, i.e. in the XY directions, among the three axial directions, the elastic support portions 2b provide a uniform connection to stabilize the vibration. With the construction described above, the vibrating portion 2a may be formed substantially circular, and the four-point support structure accommodating the XY directions is effective to suppress a difference occurring between the XY directions. The elastic support portions 4b can secure a good length in the circumferential direction, and may be formed narrow. Thus, the vibrating portion 2a can secure a large area in the diaphragm 2.

As shown in FIG. 3, each slit 2d includes an outer track adjacent the fixed portion 2c, an inner track adjacent the vibrating portion 2a, and an approximately S-shaped connecting track connecting the outer track and inner track. Compared with the case of each elastic support portion 2b having an angled connection between the vibrating portion 2a and fixed portion 2c, the above connection is curved and a force acting on the connection may be distributed to avoid its concentration. Thus, even when an excessive shock is applied to the acceleration sensor as by falling, for example, the diaphragm is less likely to be damaged and has improved shock resistance.

As shown in FIG. 4, the weight 3 is umbrella-shaped, and includes the cylindrical shaft portion 3a, and the disk-like main portion 3b having a larger diameter than the shaft portion 3a. The weight 3 is attached to the diaphragm 2 with the center of the shaft portion 3a coinciding with the center of the vibrating portion 2a of the diaphragm 2. That is, the weight 3 is attached to have the center of gravity thereof coinciding with the center of the diaphragm 2. The axis extending through the center of gravity of the weight 3 and perpendicular to the diaphragm 2 is the first axis or Z-axis. That is, the acceleration sensor detects acceleration by using the weight 3 to cause a shock applied to the sensor to generate vibrations in the XYZ directions. The weight 3 is formed of stainless steel, but may be formed of a material of greater specific gravity than stainless steel, such as tungsten (having the same specific gravity as gold), for increasing amplitude. The connection between the diaphragm 2 in the form of a metal plate and the weight 3 may be achieved by adhesion, electric welding, laser spot welding, calking, etc.

Since the diaphragm 2 is formed of a material of good strength property as described hereinbefore, its construction has a certain degree resistance to a strong shock. However, when excessive acceleration is applied as from a fall, damage can be done to the connection between the diaphragm 2 and weight 3, and to the elastic support portion 2b. To cope with such an incident, as shown in FIG. 1, a restricting member 6 is provided for contacting at least the shaft portion 3a or main portion 3b to restrict an excessive displacement of the weight 3. With this restricting member 6 provided, the weight 3 will contact the restricting member 6 before the diaphragm 2 is damaged. Thus, the acceleration sensor has excellent shock resistance.

As described above, the present invention provides a three-axis acceleration sensor having a simple construction for improving shock resistance without lowering sensor sensitivity.

While the invention provides an acceleration sensor for detecting acceleration in directions along three axes, the sensor may be used as a vibration sensor for detecting vibration acting in any direction by using the directions along three axes in combination. This vibration sensor may be used for a vibrograph or pedometer.

The invention claimed is:

1. An acceleration sensor for detecting acceleration in three orthogonal directions, comprising:
   an electrode substrate pair including two electrode substrates each having fixed electrodes arranged on one surface thereof, the fixed electrodes on one electrode substrate being opposed to the fixed electrodes on the other electrode substrate;
   a diaphragm held between said electrode substrate pair by spacers providing a predetermined distance from the said electrode substrate pair to said diaphragm, said diaphragm acting as a movable electrode; and a weight mounted on said diaphragm with the center of gravity of said weight coinciding with the center of said diaphragm;

wherein the acceleration in three orthogonal directions along a first axis, a second axis and a third axis, the first axis extending through the center of gravity of said weight and perpendicular to said electrode substrates, is detected based on variations in capacitance between said fixed electrodes and said movable electrode;

wherein said weight is formed to have an umbrella-like shape including a cylindrical shaft portion, and a disk-like main portion having a larger diameter than said shaft portion;

wherein said fixed electrodes on each of said electrode substrates include an annular, first fixed electrode extending around said first axis and having a larger diameter than said shaft portion, and second fixed electrodes and third fixed electrodes that are two parts each of an annular electrode having a larger diameter than said first fixed electrode, and divided by dividing axes forming 45 degrees with said second axis and said third axis;

wherein each of said electrode substrates has an electret layer formed to cover surfaces of said fixed electrodes, at least one of said electrode substrates defines, centrally thereof, a through hole having a diameter larger than a diameter of said shaft portion and smaller than an inside diameter of said first fixed electrode;

wherein said main portion of said weight is located outside said electrode substrate pair having said second electrodes and said third electrodes opposed to each other, respectively;

wherein said shaft portion of said weight extends through said through hole, and is connected to said diaphram; and wherein said fixed electrodes are formed on a surface of each of said electrode substrates without protruding or sinking therefrom.

2. An acceleration sensor as defined in claim 1, wherein said fixed electrodes are formed of copper foil, and said electret layer is formed, after plating said fixed electrodes with nickel or gold, by applying thereto and calcining an aqueous dispersion of a fluororesin, or applying thereto a fluoride film.

3. An acceleration sensor as defined in claim 1, wherein said diaphragm includes, as divided by four slits, a fixed portion located peripherally and fixed through said spacers, a vibrating portion located centrally and having said weight, and a plurality of elastic support portions arranged equidistantly and circumferentially of said diaphragm for connecting said fixed portion and said vibrating portion, said slits being arranged equidistantly and circumferentially of said diaphragm, with an end region adjacent said vibrating portion of each slit radially overlapping an end region adjacent said fixed portion of a next slit.

4. An acceleration sensor as defined in claim 3, wherein each of said slits includes an outer track adjacent said fixed portion, an inner track adjacent said vibrating portion, and an S-shaped connecting track connecting said outer track and said inner track.

5. An acceleration sensor as defined in any one of claims 1 and 2 to 4, wherein said diaphragm is formed of one of carbon tool steel, stainless steel, phosphor bronze, Be—Cu and Ti—Cu.

* * * * *